(12) United States Patent
Hol et al.

(10) Patent No.: US 12,464,982 B2
(45) Date of Patent: Nov. 11, 2025

(54) BALER AND A ROTARY DRIVE TRANSMISSION FOR A BALER

(71) Applicant: Kuhn-Geldrop BV, Geldrop (NL)

(72) Inventors: Jan Johannes Judocus Hol, Boekel (NL); Dionisius Cornelis Maria Akkermans, Roosendaal (NL); Sjir Hendrik Margo Vaessen, Eindhoven (NL)

(73) Assignee: Kuhn-Geldrop BV, Geldrop (NL)

( * ) Notice: Subject to any disclaimer, the term of this patent is extended or adjusted under 35 U.S.C. 154(b) by 465 days.

(21) Appl. No.: 17/969,762

(22) Filed: Oct. 20, 2022

(65) Prior Publication Data
US 2023/0130412 A1    Apr. 27, 2023

(30) Foreign Application Priority Data
Oct. 21, 2021    (GB) .................................. 2115147

(51) Int. Cl.
*A01F 15/08*    (2006.01)
*A01F 15/04*    (2006.01)
*B30B 9/30*    (2006.01)

(52) U.S. Cl.
CPC ........ *A01F 15/0841* (2013.01); *A01F 15/042* (2013.01); *B30B 9/3003* (2013.01)

(58) Field of Classification Search
CPC ...... A01F 15/08; A01F 15/0841; A01F 15/04; A01F 15/042; B30B 9/3003; B30B 9/306
See application file for complete search history.

(56) References Cited

U.S. PATENT DOCUMENTS 2,723,572 A * 11/1955 Bornzin .............. A01F 15/0841
                                                       192/30 R
3,525,302 A    8/1970 Eberly et al.
(Continued)

FOREIGN PATENT DOCUMENTS

DE        37 45 142 C2     6/2000
DE    102017109782 A1 * 11/2018    ......... A01F 15/0841
(Continued)

OTHER PUBLICATIONS

Machine translation of DE 3745142 C2—24 pages—retrieved in 2025 (Year: 2025).*
(Continued)

*Primary Examiner* — Jimmy T Nguyen
(74) *Attorney, Agent, or Firm* — Oblon, McClelland, Maier & Neustadt, L.L.P.

(57) ABSTRACT

A rotary drive transmission is provided for a baler including a bale chamber, a plunger that compresses bale material in the bale chamber, a drive mechanism that drives reciprocating movement of the plunger, and a flywheel connected to a rotary input of the drive mechanism. The rotary drive transmission includes a rotary drive part, a rotary driven part that drives rotation of the flywheel, and a torsional drive transfer device that transfers rotary drive between the rotary drive part and the rotary driven part. The torsional drive transfer device includes a resilient element and is configured to allow limited relative rotation in the drive direction between the rotary drive part and the rotary driven part against a reaction force provided by the resilient element.

15 Claims, 7 Drawing Sheets

(56) References Cited

U.S. PATENT DOCUMENTS

| | | | | |
|---|---|---|---|---|
| 4,099,594 A | * | 7/1978 | Smith | A01D 69/002 |
| | | | | 74/15.69 |
| 2003/0167939 A1 | * | 9/2003 | Roth | A01F 15/0841 |
| | | | | 100/270 |
| 2020/0096048 A1 | | 3/2020 | Merrill et al. | |
| 2020/0163282 A1 | | 5/2020 | Figger et al. | |

FOREIGN PATENT DOCUMENTS

| | | |
|---|---|---|
| EP | 0 566 992 A1 | 10/1993 |
| EP | 2 113 688 A1 | 4/2009 |
| GB | 689883 | 4/1953 |

OTHER PUBLICATIONS

Machine translation of DE 102017109782 A1—6 pages—retrieved in 2025 (Year: 2025).*

Extended European Search Report issued Feb. 17, 2023, in corresponding European Patent Application No. 22201994.5 citing documents 1, 2, 15-17 therein, 8 pages.

* cited by examiner

BALER AND A ROTARY DRIVE TRANSMISSION FOR A BALER

BACKGROUND OF THE INVENTION

Field of the Invention

The present invention relates to a baler, in particular but not exclusively an agricultural baler for baling an agricultural crop, and a rotary drive transmission for a baler.

Description of the Related Art

For efficient transport and storage, agricultural products like hay, straw and silage may be compressed into bales of a parallelepiped shape, which are known as 'square' bales. After compression of the bale material the shape and the compression of the bale is maintained by binding the bale with twines that are looped around the compressed bale material. The ends of the twine are then knotted together.

Typically, compression of the bale material is performed by a reciprocating plunger press baler. A typical baler of this type is described in U.S. Pat. Nos. 4,074,623 and 4,142,746 to Hesston Corporation. This baler includes a pick-up device for picking up bale material from the ground, a feed device and a baling chamber comprising an open ended channel through which bale material is forced by a reciprocating plunger. The plunger is driven in a linear direction between a withdrawn position in front of the baling chamber and an extended position in which it extends into the baling chamber. When the plunger is in the withdrawn position the baling chamber is loaded with the bale material. The plunger is then driven into the baling chamber so that this new material is compressed against a body of compressed material already in the baling chamber. The newly compacted material is called a 'wad'. The friction of the compressed material with the walls of the baling chamber channel provides a resistive force allowing for compression of the new material that is introduced into the baling chamber in front of the plunger.

After compression, the newly compressed material and the compressed material already in the baling chamber are moved together towards the outlet end of the baling chamber until the plunger reaches its fully extended end position. The plunger then moves in the opposite direction towards its withdrawn position so that the baling chamber can be reloaded with new material to be compressed.

This process is repeated until the body of compressed material in the baling chamber has reached the required length to form a bale. The body of compressed material is then bound with twine, which is knotted by a knotter device. The whole process is then repeated to form another bale. As the new bale is formed the previously formed bale is gradually pushed towards the outlet end of the baling chamber and is eventually ejected from the chamber.

During the compression stroke, the force exerted by the plunger increases as the bale material is compressed and typically reaches a maximum value at the moment when the newly entered bale material has been compressed and the bale material already in the channel starts to shift backwards towards the outlet end of the baling chamber. The maximum value of the plunger force thus depends on the level of friction between the compressed material and the sides of the baling chamber.

The friction within the baling chamber between the compressed material and the sides of the chamber can be regulated by pressing the side panels and/or the top panel of the baling chamber against the compressed material with different levels of force. To avoid damaging the machine, the desired maximum plunger force should not exceed a set value determined by the mechanical design of the machine, but may typically range from, for example, 10% to 100% of the maximum designed plunger force depending on the required degree of compression.

Typically, the plunger is driven from a rotary drive mechanism or driveline that includes a gearbox, a drive shaft and a rotating crank. In this case the maximum plunger force of the baling machine is usually limited by the maximum allowable drive torque of the driveline, which is determined mainly by the design of the gearbox. This maximum drive torque will provide a maximum plunger force that varies with the position of the crank.

In general, the drive torque will be approximately zero (apart from the torque required to overcome frictional forces) when the plunger is moving forwards from the withdrawn position and the angle Q between the crank and the plunger rod is less than approximately 90 degrees. The drive torque will then increase as the plunger compresses the bale material and the angle Q increases from 90 degrees to 180 degrees, typically from 120 to 180 degrees, and will then be negative from 180 degrees to approximately 200 degrees as the compressed bale material pushes the plunger back towards the starting position.

During a compression cycle, the force exerted by the plunger is typically at a maximum at the moment when the bale material in the channel starts to shift backward. At this moment the plunger is at a distance about equal to the wad thickness from the extended end position of the plunger. During the shifting of the compressed material the plunger force will remain at a level that is slightly lower than the maximum force. Higher plunger forces will lead to a higher level of compression and a higher density of the bales.

In practice, there is an inverse relationship between the quantity of bale material to be compressed on each compression stroke of the plunger and the maximum level of compression of the bale material and the density of the bale. If a large quantity of material is fed into the bale chamber this will result in a large wad thickness and a lower level of compression, and therefore a lower density. On the other hand, if a small quantity of bale material is fed into the bale chamber on each stroke this will result in a small wad thickness and a high maximum level of compression, and therefore a high density. As the throughput of the baling machine (that is, the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density, or a balance between throughput and density.

There is also an inverse relationship between speed of compaction and the density of the bale, a slower speed of compaction resulting in a higher density and a faster speed of compaction resulting in a lower density.

The baler requires the most power (torque) when the plunger is compacting the material. Typically, the plunger is driven by a crank that is rotating at a speed of 40-50 RPM and the peak in the driveline torque occurs when the angle Q between the crank and the plunger rod is in the range of about 120 to 180 degrees. Because the required torque during the peaks cannot be delivered by the tractor alone, the driveline is equipped with a flywheel. This flywheel (mostly driven at 1000-1500 rpm) stores the energy needed to support the tractor driveline to overcome the peaks in the torque required for the compacting the material. Because the tractor is not able to deliver the required torque at the peaks, the rpm in the driveline will decrease (the motor is partially stalled) and because of the rpm decrease the inertia of the flywheel will then assist the tractor. The (pulsating) decrease of the rpm of the driveline will result also in a (pulsating) decrease of the drive speed of the tractor as they typically are linked to each other. This pulsating decrease of speed is perceived as inconvenient. Also it requires relatively more fuel consumption during the peak loads of the tractor Lately the required maximum torque at the peaks of torque for compacting has been increased due to higher compaction requirements. As a result, the higher torque demand will lead to a bigger decrease in driving speed and more inconvenience in driving speed. In addition, the demand for higher throughput causes the torque peaks to last for a longer part of the compression cycle, causing a further drop in the rpm of the driveline.

In order to reduce the negative effects described above, baler manufacturers have increased the inertia of the flywheel in order to reduce the decrease of the RPM of the driveline, by increasing the weight of the flywheel and/or the rotational speed of the flywheel. This has the drawback that for starting the baler the tractor is not able to speed up the flywheel from zero to the working speed without fully stalling the tractor motor or requiring great skills of the operator to start the baler or having a greater risk of damaging the clutch of the PTO on the tractor. Therefore, costly solutions have been introduced to startup the baler. These include for example starting up the baler (flywheel) at a lower speed first and then gearing up to the regular 1000 (or 1500) rpm with extra gears and clutch or by starting up the flywheel at a low speed by using an additional (hydraulic) motor. In order to overcome the torque peaks other manufacturers have added an extra motor or motors to assist the drive from the tractor during the torque peaks. The extra motor(s) adds extra cost and complexity to the driveline It is an object of the invention to mitigate at least one of the aforesaid problems.

According to one aspect of the invention there is provided a rotary drive transmission as defined by the claims.

According to another aspect of the invention there is provided a reciprocating plunger press as defined by the claims.

BRIEF SUMMARY OF THE INVENTION

In an exemplary embodiment there is provided a rotary drive transmission for a baler comprising a bale chamber, a plunger that compresses bale material in the bale chamber, a drive mechanism that drives reciprocating movement of the plunger, and a flywheel connected to a rotary input of the drive mechanism, wherein the rotary drive transmission comprises a rotary drive part, a rotary driven part that drives rotation of the flywheel, and a torsional drive transfer device that transfers rotary drive between the rotary drive part and the rotary driven part, wherein the torsional drive transfer device comprises a resilient element and is configured to allow limited relative rotation in the drive direction between the rotary drive part and the rotary driven part against a reaction force provided by the resilient element.

The invention provides a simpler solution to resolve the issue of high peak torque and inconvenient driving pattern of the tractor, while enabling the tractor to start up the flywheel without extra motors or clutch and gearing. Also, as a result of a reduced drive speed during compaction, the density of the bale will increase.

An embodiment of the invention incorporates a torsional drive transfer device in the driveline between a drive part and a driven part comprising the flywheel. The drive part may for example be connected to receive drive from the power take off (PTO) of a tractor (the driving source). The driven part may be the flywheel (driven source) of the baler, or a drive shaft connected to the flywheel. The torsional drive transfer device allows limited relative rotation between the drive part and the driven part and reduces the peak torque required from the tractor by allowing the driven part of the baler to temporarily run at an RPM lower than that given by tractor so that more energy/torque is supplied from the flywheel to the plunger than would be supplied without the torsional drive transfer. Between the torque peaks more energy is supplied by the motor to the flywheel so that the speed of the flywheel increases to above its nominal value.

Thus, the invention provides for an alternating transfer of energy between the torsional drive transfer device and the flywheel, wherein the torsional drive transfer device stores mechanical energy by deformation of the resilient element during torque peaks when the flywheel is rotating more slowly than the PTO, and this mechanical energy is then converted to kinetic energy in the flywheel as it accelerates between torque peaks. This levels out the delivery of power from the tractor but with no overall increase in the energy consumed. The temporary speed reduction is of no harm to the baler; the temporary overspeed to catch up with the tractor is also no problem.

Optionally, the torsional drive transfer device is configured to allow limited relative rotation up to a maximum relative rotation angle of at least 30° and preferably no more than 360°, preferably in the range 30° to 180°, preferably in the range 50° to 120°.

A relative rotation value of at least 30 degrees between the drive part and the driven part is necessary to significantly reduce the flywheel rotational speed relative to the PTO speed of the tractor. To ensure that the tractor remains synchronized with the baler during operation the maximum amount of relative rotation permitted between the drive part and the driven part should not be more than 360 degrees. Preferably, the maximum amount of relative rotation permitted between the drive part and the driven part is in the range 30-180 degrees, more preferably 50-120 degrees.

Optionally, the torsional drive transfer device is configured to allow limited relative rotation between the rotary drive part and the rotary driven part only when a torque applied to the drive part exceeds a predetermined minimum value.

Optionally, the torsional drive transfer device is configured to allow limited relative rotation between the rotary drive part and the rotary driven part only when a torque applied to the drive part exceeds a predetermined minimum value in the range 200-1000 Nm, preferably at least 500 Nm.

Optionally, the resilient element is pre-stressed to provide the predetermined minimum value.

Optionally, the resilient element comprises at least one hydro-pneumatic element connected between the rotary drive part and the rotary driven part.

Optionally, the hydro-pneumatic element includes an accumulator.

Optionally, the hydro-pneumatic element includes an adjusting mechanism that is adjustable to provide a variable reaction force.

Optionally, the hydro-pneumatic element lies in a plane that is perpendicular to a rotary axis Z of the torsional drive transfer device.

Optionally, the resilient element comprises at least one mechanical spring element connected between the rotary drive part and the rotary driven part. Optionally, mechanical spring element lies in a plane that is perpendicular to a rotary axis Z of the torsional drive transfer device. In an example, the torsional drive transfer device contains one or more springs in a plane perpendicular to the main axis of the driveline.

Optionally, the mechanical spring element has a principal axis that is parallel to a rotary axis Z of the torsional drive transfer device. In an example, the torsional drive transfer device contains one or more springs, for example coil springs, that extend parallel to the main axis or in the main axis of the driveline.

Optionally, the mechanical spring element comprises a coil spring or a leaf spring.

In an embodiment, the torsional drive transfer device incorporates a hydraulic cylinder and an accumulator that is configured to accommodate the relative rotation of the drive part and the driven part.

Optionally the relative rotation between drive part and the driven part is only possible from a set minimum torque: i.e. when the torque in the driveline exceeds a predetermined minimum value. It is preferable that relative rotation of the drive part and the driven part is prevented when the torque is less than the predetermined value, because for other non-crank parts of the baler some torque (preferably a constant torque) is required, which should not be absorbed by the drive transfer device. Preferably, in one embodiment, a torque of 500 Nm is selected as the predetermined value.

In an embodiment, the drive part is allowed limited rotational movement relative to the driven part in the drive direction. In other words, the torsional drive transfer device is configured to allow limited relative rotation of the drive part relative to the driven part in the driven direction, against the resilient reaction force provided by the torsional drive transfer device.

Optionally, the torsional drive transfer device comprises a damper configured to damp relative rotational movement between the rotary drive part and the rotary driven part. By this means the release of the torsional drive transfer device can be damped. For example, the torsional drive transfer device may be configured to release the relative rotation provided by the spring/hydraulic drive transfer over a part of the rotation of the crank where a reduction in the torque is not required, this part typically comprising about % of each rotation of the crank.

Optionally the RPM on the baler is reduced by 20% at the end of the load peak of the plunger. For example, the RPM of the flywheel may be reduced from about 1000 RPM to about 800 RPM at the end of the load peak of the plunger.

Optionally the drive transfer characteristics of the torsional drive transfer device are adjustable according to the field circumstances and/or tractor characteristics in order to provide a steady power supply from the tractor.

According to another embodiment of the invention there is provided a reciprocating plunger press comprising a bale chamber, a plunger that compresses bale material in the bale chamber, a drive mechanism that drives reciprocating movement of the plunger, a flywheel connected to a rotary input of the drive mechanism, and a rotary drive transmission according to any one of the preceding statements of invention.

An embodiment of the invention will now be described by way of example with reference to the accompanying drawings, wherein:

DETAILED DESCRIPTION OF THE INVENTION

Figure 1:
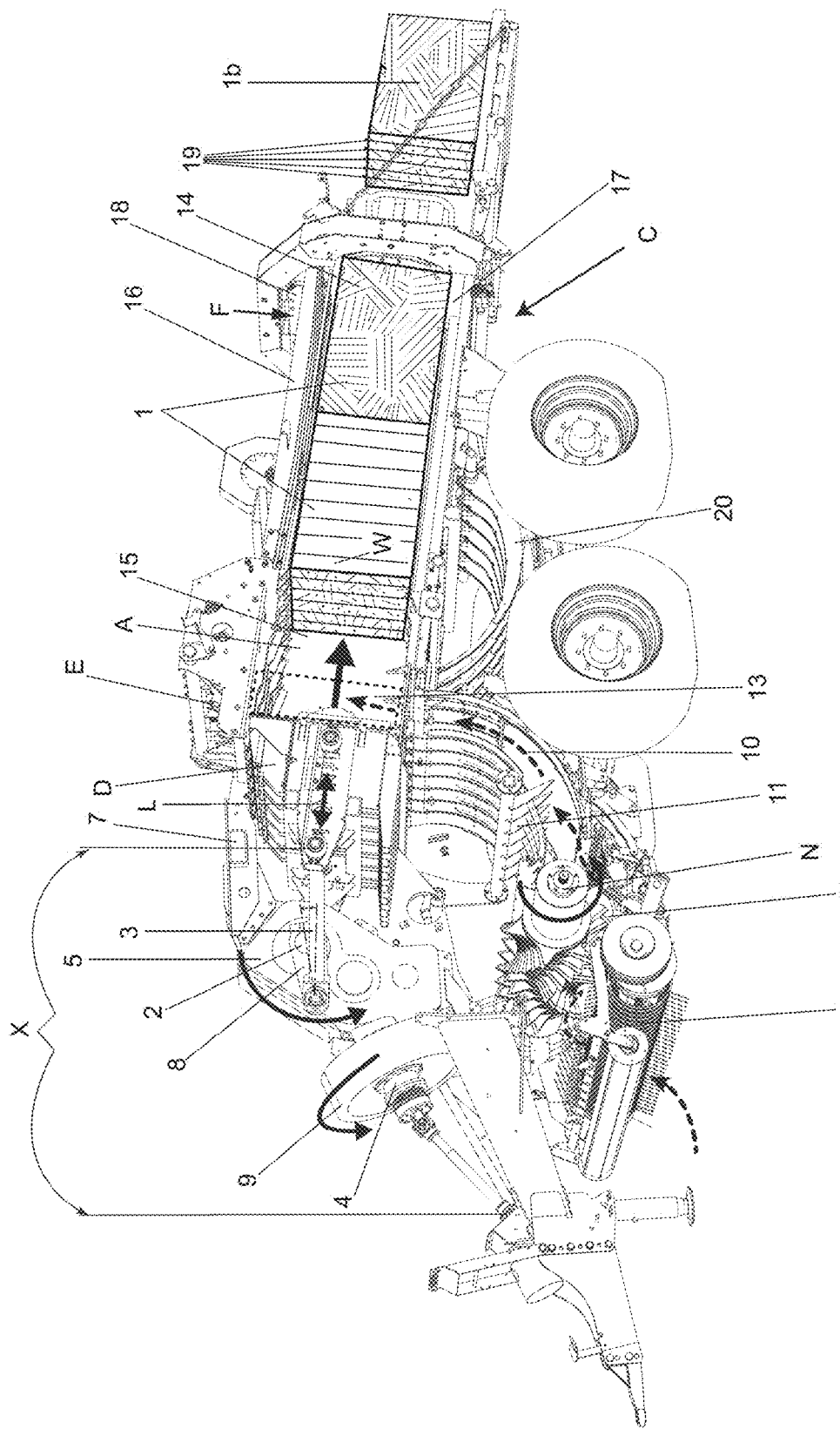
FIG. 1 is an isometric view showing the main components of a conventional baler.
Figure 2:
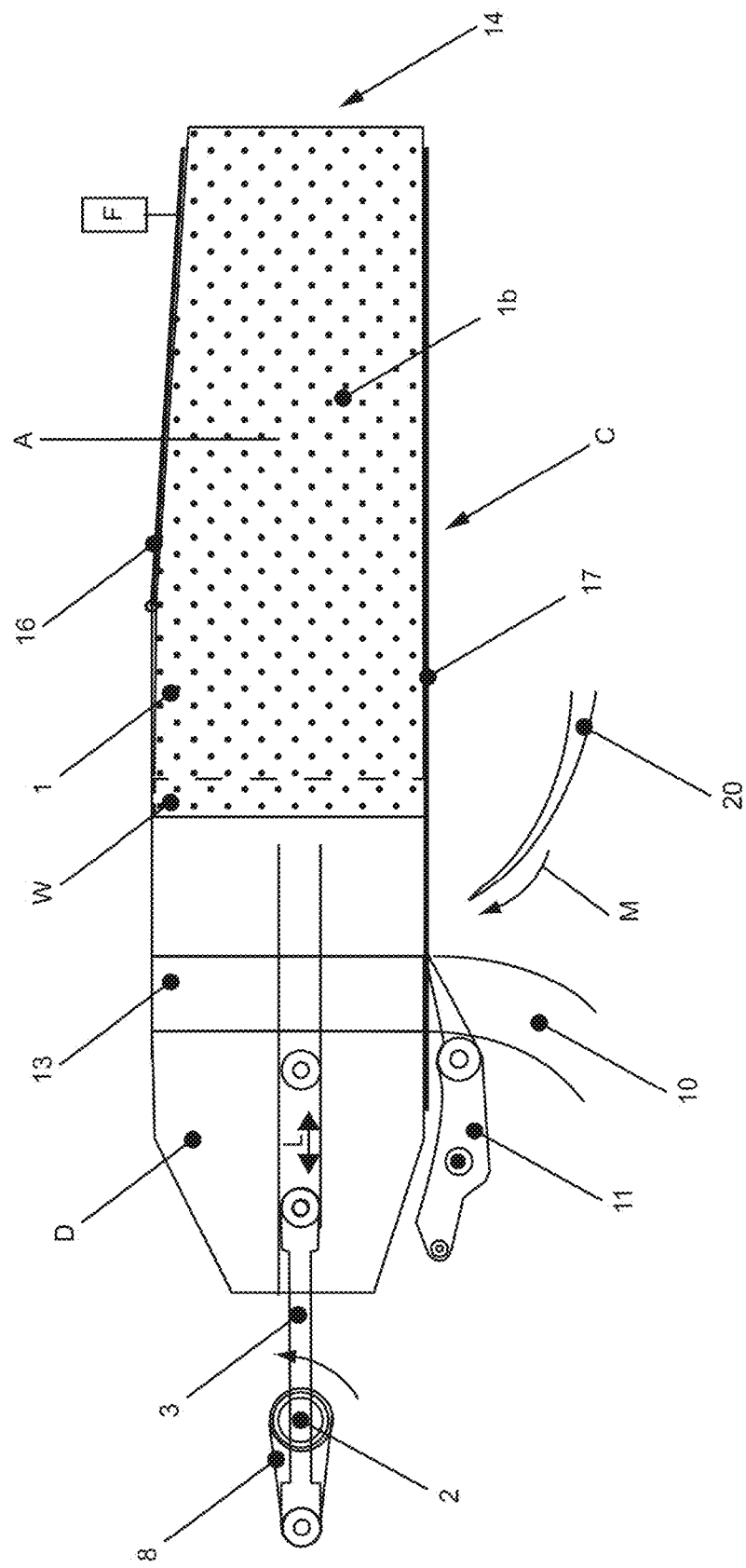
FIGS. 2-4 are schematic cross-sectional side views of the baler, showing the baler in three different operational positions during a baling operation.

The conventional baler or baling machine shown in FIGS. 1-4 is configured to be pulled over a field and driven by a towing vehicle, for example a tractor (not shown) and includes a draw bar structure S that allows it to be hitched behind the tractor. Alternatively, the baler could be self-propelled and/or self-driven.

The conventional baler includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of the towing vehicle, for example the power take off (PTO) of a tractor. These components are all conventional and may for example be as described in U.S. Pat. Nos. 4,074,623 and 4,142,746. The baling machine also includes a binding device E for binding the bale with binding twine. This binding device may for example be as described in U.S. Pat. No. 4,074,623.

The baling chamber C comprises an open ended bale-forming channel A through which compressed bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a drive input shaft 4 through which it receives drive from the drive output of the towing vehicle. The gearbox 5 is mounted on a frame 7 of the baling machine. The drive input shaft carries a large flywheel 9 for smooth operation of the baler.

Typically the material to be baled is taken up from the ground by the pick-up device M. The feed device N feeds the material to an intermediate material buffer 10. The feed device N may be equipped with knives 12 for cutting up the material to be baled. When sufficient material has collected in the intermediate buffer 10, a stuffer 11 forwards the material into the bale chamber C in front of the plunger D. The material is then ready to be compressed.

The open ended channel A that forms the baling chamber C has an inlet end 13 and an outlet end 14. The bale-forming channel A is defined by two side panels 15 (one of which has been omitted in FIG. 1 to show the interior of the baling chamber C), a top panel 16 and a bottom panel 17. The top panel 16 (and/or one or both of the side panels 15) may comprise an adjustable panel that is pivotable about its upstream end allowing the cross-sectional area of the bale-forming channel A to be adjusted. An adjusting mechanism 18 for adjusting the position of the adjustable panel 16 is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L in the longitudinal direction of the baling chamber between two end positions comprising respectively a withdrawn position (FIG. 2) in front of the baling chamber C and an extended position (FIG. 4) in which it extends into the channel A of the baling chamber C. When the plunger is in the withdrawn position (FIG. 2) the baling chamber C is loaded with the bale material to be compressed. The plunger D is then driven into the baling chamber so that this new bale material is first shifted into contact with a body of compressed material 1 already in the baling chamber C and then compressed against that body of material. The newly compacted material forms a wad W that is added to the already compacted material 1 in the channel A. The friction of the compressed material 1 with the panels 15, 16, 17 of the baling chamber C provides a resistive force allowing for compression of the new material that is introduced into the baling chamber C in front of the plunger D.

After compression, continued movement of the plunger D drives the wad W of newly compressed material and the compressed material 1 already in the baling chamber C towards the outlet end 14 of the baling chamber until the plunger D reaches its fully extended end position. The plunger D then returns in the opposite direction to its withdrawn position so that the baling chamber C can be reloaded with new material to be compressed. The plunger therefore performs a compression cycle that consists of a compression stroke followed by a return stroke. This compression cycle is repeated continuously until the baling process is finished.

A bale 1b is formed from the compressed material in the baling chamber and bound with multiple twines 19 that are looped around the body of compressed material in order to hold it in compression after leaving the baling machine. The binding process that forms each loop of twine can be performed as follows.

At the start of the baling process two lengths of twine from spools (not shown) on opposite sides of the baling chamber C are connected to one another by tying the ends of the twines together using the binding device (or knotter) E. As the bale material is compacted in the baling chamber C the spools feed twine to the baling chamber C on either side of the bale material. On one side of the baling chamber C each twine passes through the tip of a baling needle 20. When the body of compressed bale material 1 has reached its full length, between two successive compressing strokes, the needle 20 moves in the direction of arrow M through a slot in the plunger D and brings the twine as a loop to the other side of the baling chamber C. The knotter E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Figure 3:
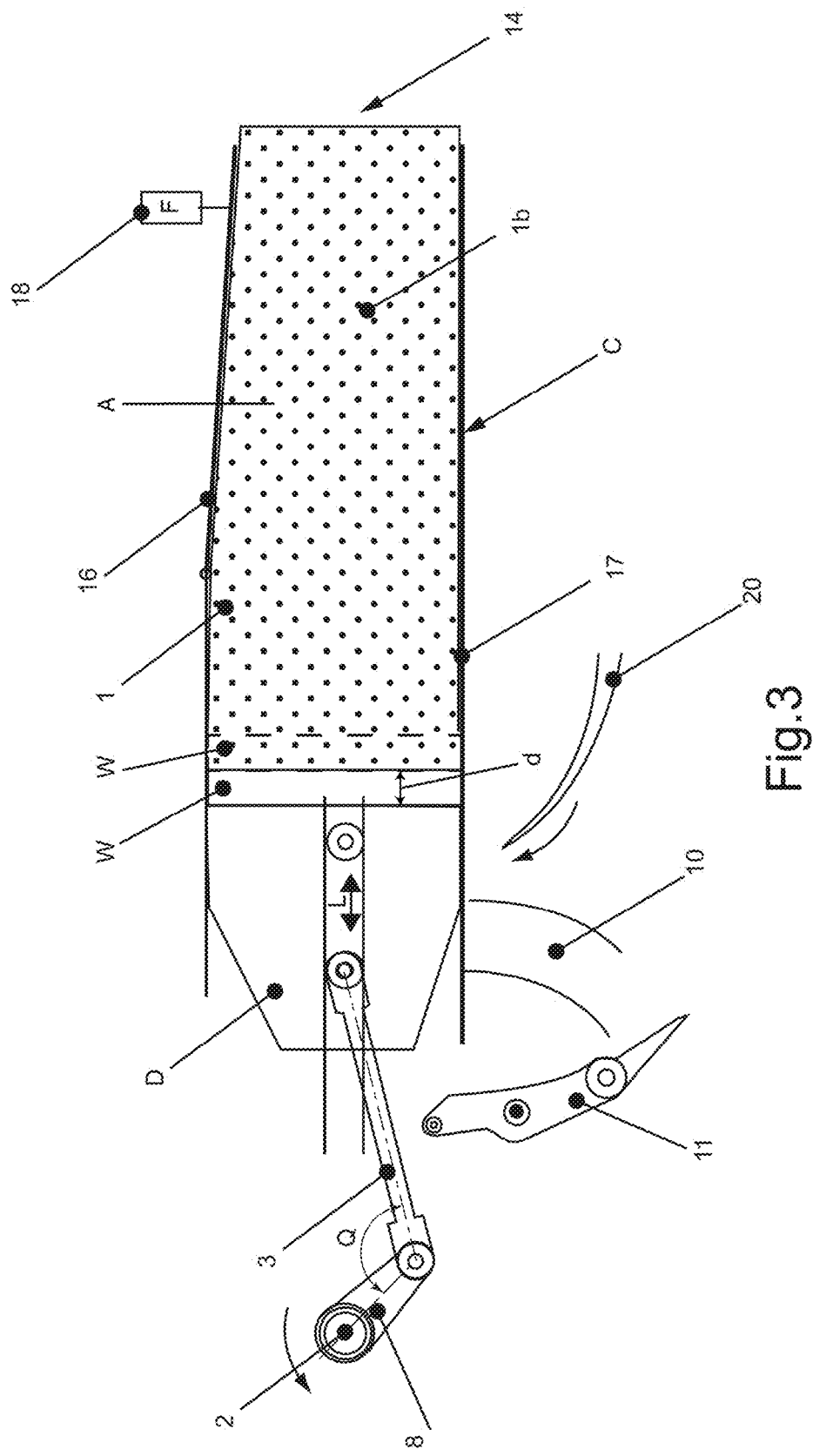
Figure 4:
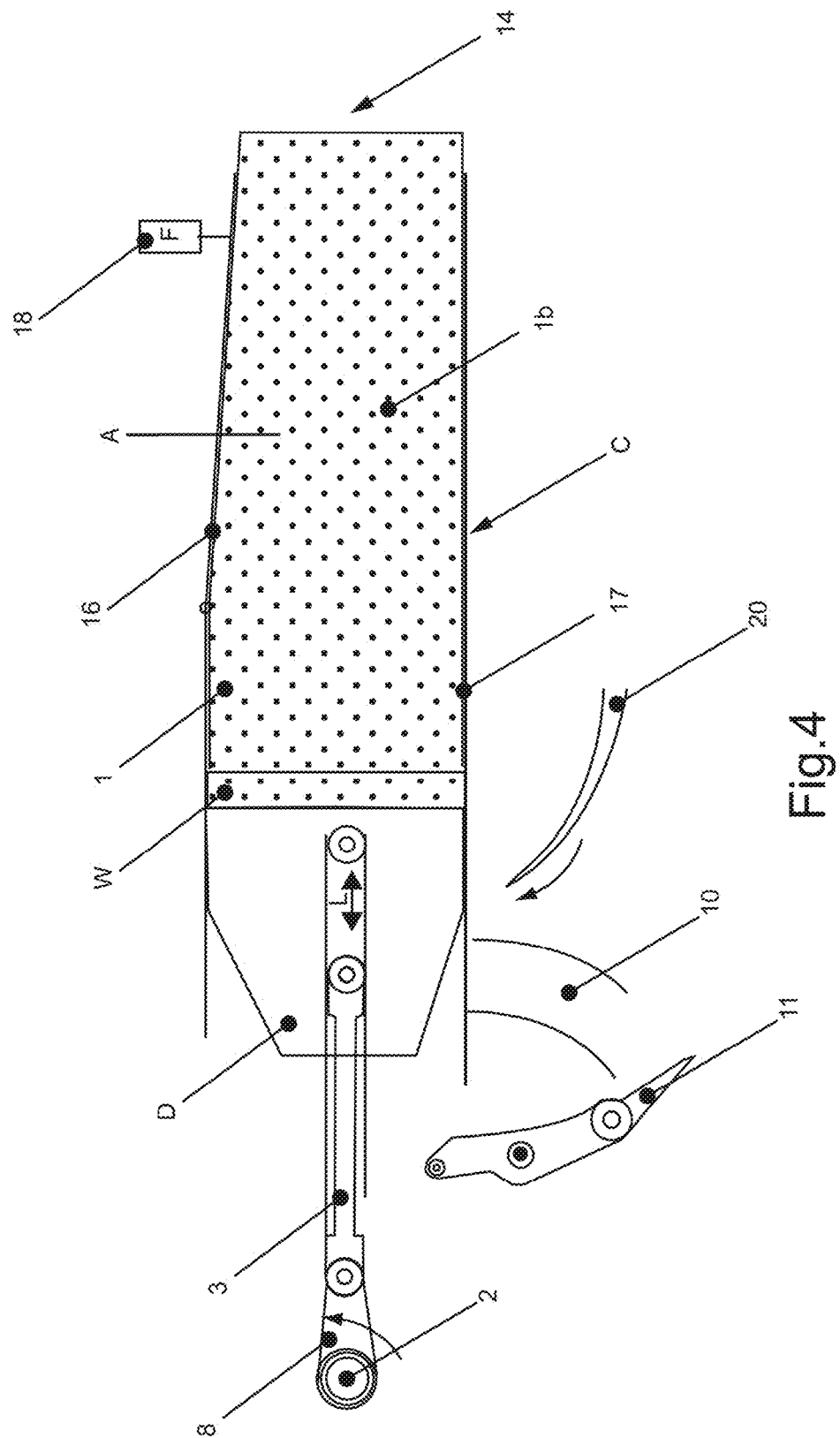

During a compression cycle, the force exerted by the plunger D is typically at a maximum at the moment when the newly fed bale material has been compressed and the bale material 1 already in the channel A starts to shift backwards (FIG. 3). At this moment the plunger is at a distance about equal to the wad thickness d from the extended end position of the plunger. During the shifting of the compressed material the plunger force will remain at a level that is slightly lower than the maximum force.

The maximum plunger force of the baling machine is limited by the maximum allowable drive torque of the driveline. During the compression the driveline for example requires a torque up to 90.000 Nm at the crank axle, which corresponds to an input torque of 4000 Nm at 1000 RPM at the input of the gearbox. A tractor of for example 250 HP can deliver a torque of max 1700 Nm at 1000 RPM at the PTO. The deficit between the torque required by the baler and the max torque delivered by the tractor is supplied by the inertia of the flywheel as it slows down during the compression stroke. This variation in the required torque causes the rotational speed of the driveline between the tractor and the baler to increase and decrease in a cyclical manner as the plunger reciprocates.

The invention describes a baler and a drivetrain for a baler that reduces the variation in rotational speed of the driveline between the tractor and the baler and provides for improved operation of the baler.

Figure 5:
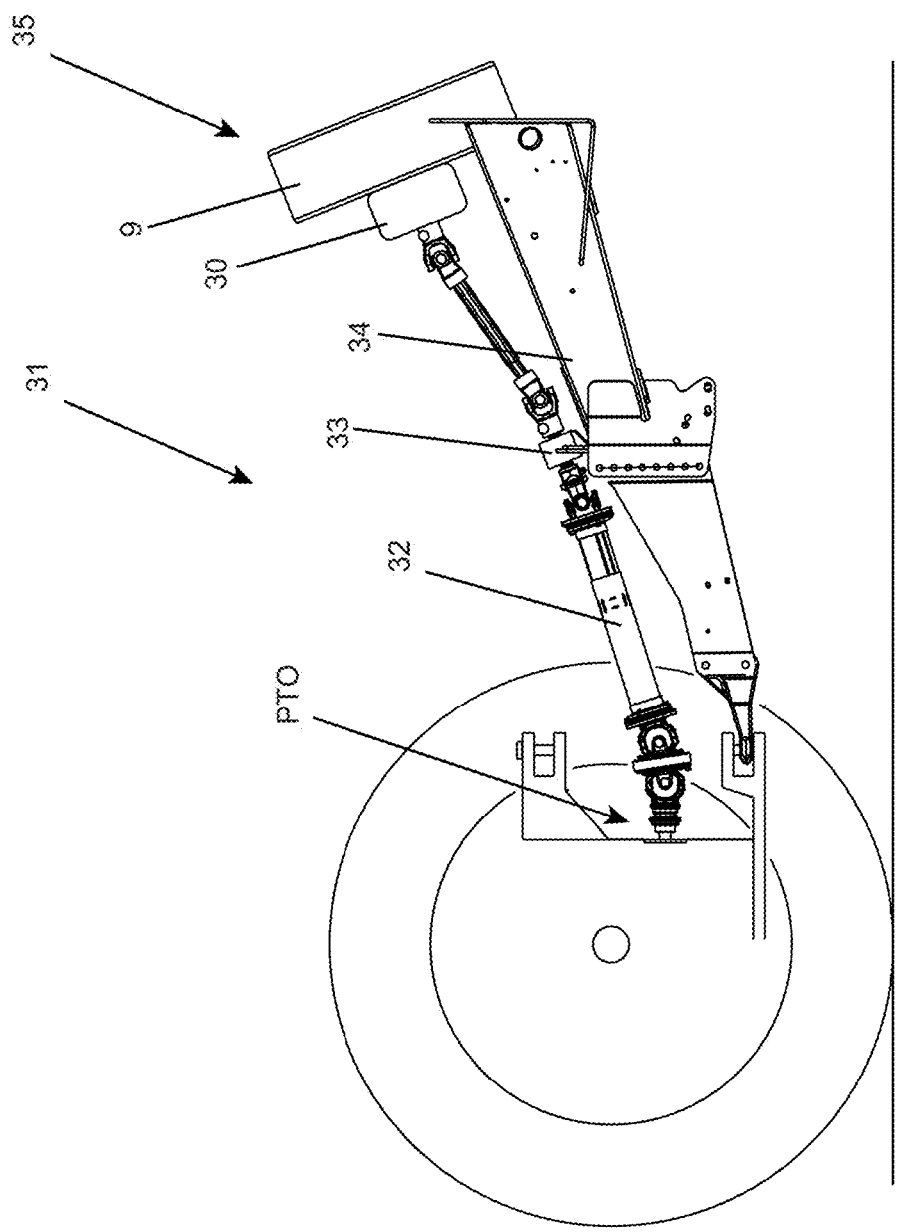
FIG. 5 is a side view of a driveline provided between a tractor and a baler according to an embodiment of the invention.
Figure 7:
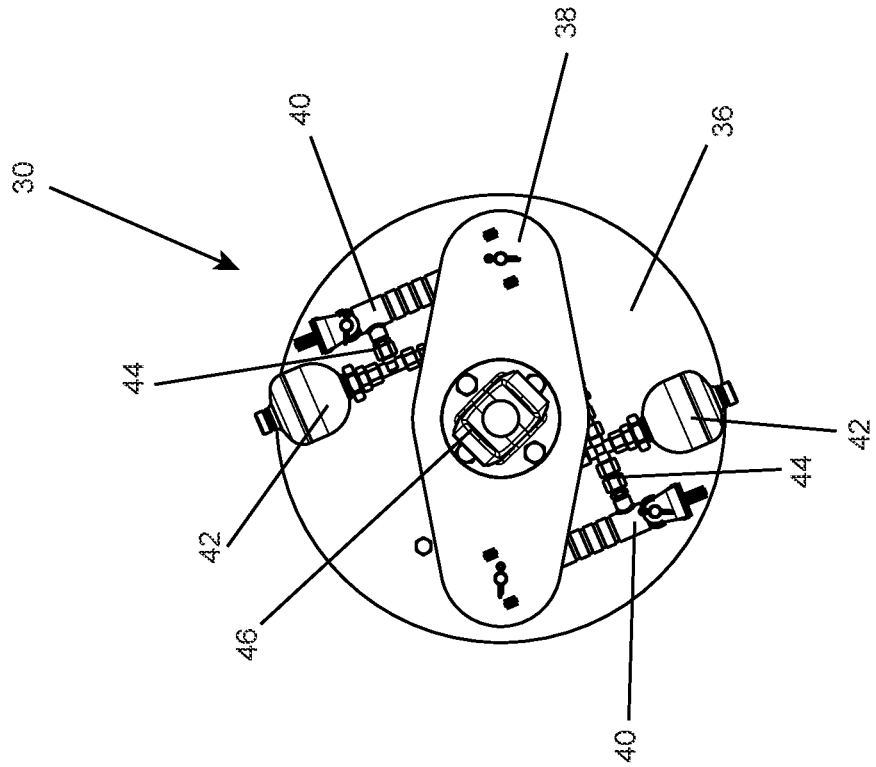
FIGS. 6 & 7 are isometric and plan views of a torsional drive transfer device that forms part of the driveline.
Figure 6:
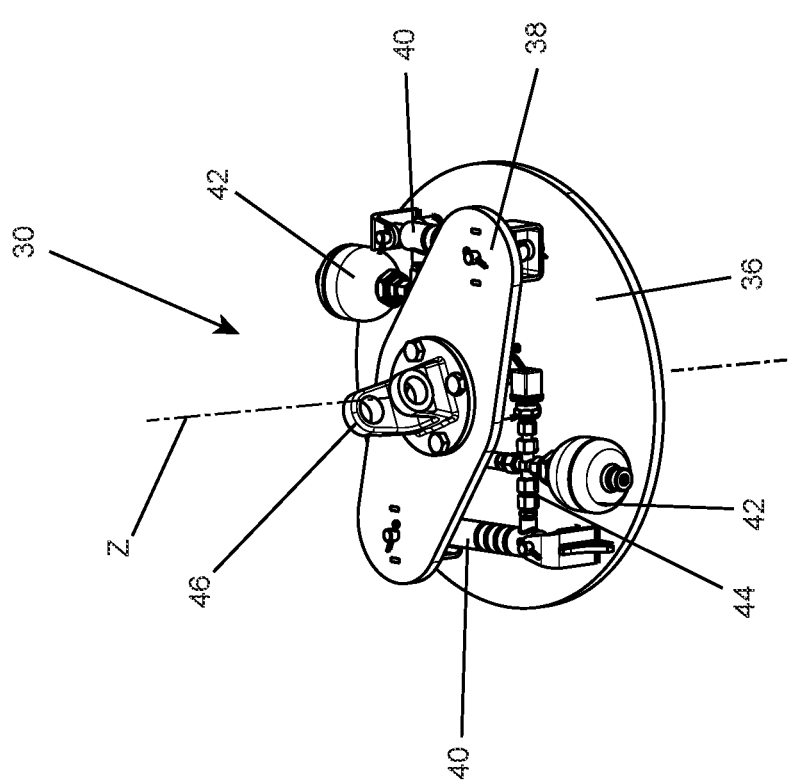

In a baler according to one embodiment of the present invention, the driveline X between the tractor and the baler is modified to include a torsional drive transfer device 30, for example as illustrated in FIGS. 5-7. In the illustrated embodiment the torsional drive transfer device 30 is located between a drive part 31, which in this embodiment comprises a drive shaft mechanism 32, 33, 34, and a driven part 35, which in this embodiment comprises the flywheel 9. In this example the drive part 31 comprises a first drive shaft 32 that is connected to the PTO of a tractor, a support axle 33 and a second drive shaft 34, which is connected to the torsional drive transfer device 30. Alternatively, the torsional drive transfer device 30 may be located elsewhere in the driveline X, for example at the location of the support axle 33.

The torsional drive transfer device 30 is configured to allow limited rotation of the drive part 31 relative to the driven part 35 by torsion or resilient twisting of the torsional drive transfer device 30 while continuing to transfer torque from the drive part 31 to the driven part 35.

In the embodiment illustrated in FIGS. 6 and 7 the torsional drive transfer device 30 comprises a drive input element 38 and a drive output element 36 that are connected to one another and configured for relative rotation about a rotary axis Z. The drive input element 38 and the drive output element 36 are interconnected by one or more resilient drive transfer elements, for example springs or hydro-pneumatic elements. In this embodiment the resilient drive transfer elements comprise two hydraulic cylinders 40 and two hydro-pneumatic accumulators 42, which form hydraulic springs. An adjusting device 44 is provided for adjusting the force transfer characteristics of one or more of the drive transfer elements 40, 42. A universal joint 46 is attached to the drive input element 38 for transferring rotary drive from the drive part 31 to the drive input element 38.

Optionally, the hydraulic springs 40 are located in a plane perpendicular to the main axis Z of the driveline. Alternatively or in addition, the torsional drive transfer device 30 may contain one or more mechanical or hydraulic springs that extend parallel to the main axis Z or are located on the main axis Z of the driveline.

Optionally the torsional drive transfer device incorporates a hydraulic cylinder 40 and an accumulator 42 that is configured to accommodate the relative rotation of the drive input element 38 and the drive output element 36 to accommodate relative rotation between the drive part 31 and the driven part 35, for example the flywheel 9.

Figure 8:
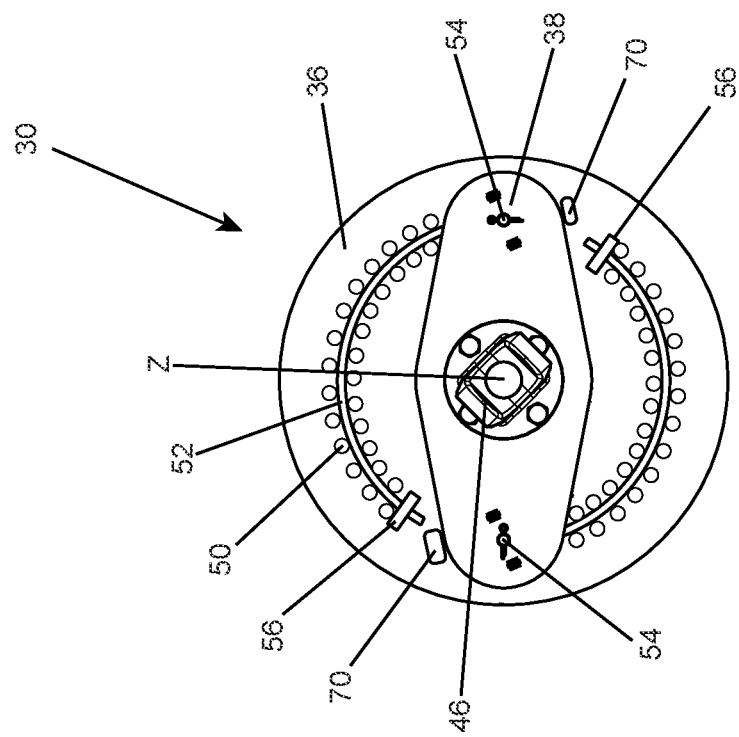

In the first alternative embodiment illustrated in FIG. 8 the torsional drive transfer device 30 comprises a drive input element 38 and a drive output element 36 that are connected to one another and configured for relative rotation about a rotary axis Z. The drive input element 38 and the drive output element 36 are interconnected by a pair of drive transfer elements comprising coil springs 50 mounted on curved guide rods 52 that lie in a plane perpendicular to the rotary axis Z. Each spring 50 is compressed between a first stop 54 on the drive input element 38 and a second stop 56 on the drive output element 36. A universal joint 46 is attached to the drive input element 38 for transferring rotary drive from the drive part 31 to the drive input element 38. The springs 50 transfer the torque to the drive output element 36 and optionally can be compressed when the drive torque exceeds a predetermined value that depends on the strength and pre-compression of the springs 50 and the position of the stop 70 which prevents the drive input element 38 from rotating counter clockwise relative to the drive output element 36 and thus provides for pre-compression of the springs 50 in the rest position of the drive input element 38.

Figure 9:
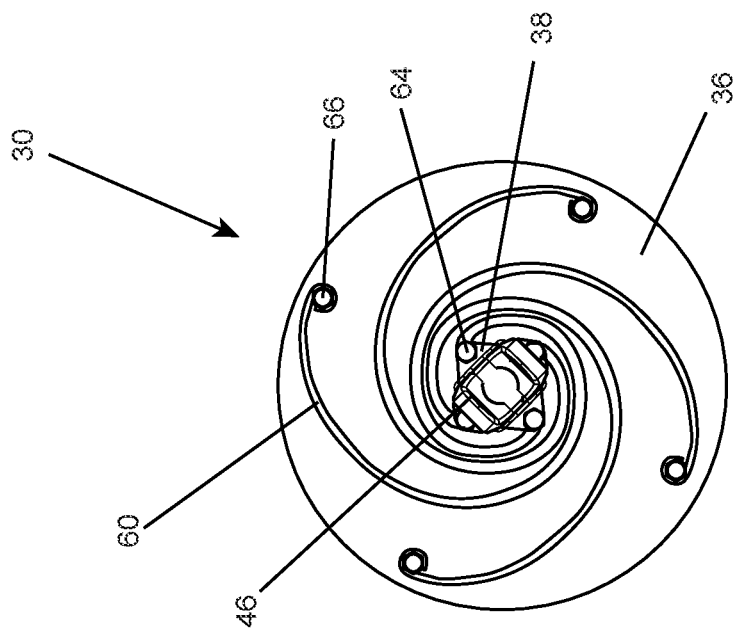
FIGS. 8 & 9 are plan views of alternative torsional drive transfer devices that form a part of the driveline in additional embodiments of the invention.

In the second alternative embodiment illustrated in FIG. 9 the torsional drive transfer device 30 comprises a drive input element 38 and a drive output element 36 that are connected to one another and configured for relative rotation about a rotary axis Z. The drive input element 38 and the drive output element 36 are interconnected by a set of four drive transfer elements comprising leaf springs 60 that lie in a plane perpendicular to the rotary axis Z. Each leaf spring 60 is connected between a first mounting pin 64 on the drive input element 38 and a second mounting pin 66 on the drive output element 36. A universal joint 46 is attached to the drive input element 38 for transferring rotary drive from the drive part 31 to the drive input element 38. optionally The leaf springs 60 transfer the torque to the drive output element 38 and can be wound more tightly around the rotary axis Z against a stop (not shown) when the drive torque exceeds a predetermined value that depends on the strength and shape of the leaf springs 60.

Optionally the relative rotation between the drive input element 38 and the drive output element 36 is only possible from a set minimum torque: i.e. when the torque in the driveline exceeds a predetermined minimum value. It is preferable that relative rotation of the drive part and the driven part is prevented when the torque is less than the predetermined value, because for other non-crank parts of the baler some torque (preferably a constant torque) is required, which should not be absorbed by the drive transfer device 30. Preferably, in one embodiment, a torque of 500 to 1000 Nm is selected as the predetermined minimum value.

Optionally the drive input element 38 is allowed limited rotational movement relative to the drive output element 36 in the drive direction. In other words, the torsional drive transfer device 30 is configured to allow limited relative rotation of the drive input element 38 relative to the drive output element 36 in the driven direction, against the resilient reaction force provided by the drive transfer elements 40, 42 of the torsional drive transfer device 30.

Optionally the release of torsion within the torsional drive transfer device 30 is damped. For example, the torsional drive transfer device 30 may be configured to release the relative rotation provided by the spring/hydraulic drive transfer elements over a part of the rotation of the baler crank where a reduction in the torque is not required, this part typically comprising about % of each rotation of the crank.

Optionally the amount of relative rotation permitted between the drive input element 38 and the drive output element 36 is in the range 30-120 degrees, preferably 50-90 degrees.

Optionally the RPM on the baler is reduced by about 20% at the end of the load peak of the plunger.

Optionally the RPM of the flywheel 9 is reduced from about 1000 RPM to about 800 RPM at the end of the load peak of the plunger.

Optionally the drive transfer characteristics of the torsional drive transfer device 30 are adjustable using the adjusting device 44 according to the field circumstances and/or tractor characteristics in order to provide a steady power supply from the tractor. For example, the adjusting device 44 may be configured to adjust the amount of torque required to cause relative rotation of the drive input and the drive output elements 38, 36 and/or to adjust the damping characteristics of the drive transfer device 30.

The invention claimed is:

1. A rotary drive transmission for a baler comprising a bale chamber, a plunger that compresses bale material in the bale chamber, a drive mechanism that drives reciprocating movement of the plunger, and a flywheel connected to a rotary input of the drive mechanism, the rotary drive transmission comprising:
    a rotary drive part,
    a rotary driven part that drives rotation of the flywheel, and
    a torsional drive transfer device that transfers rotary drive between the rotary drive part and the rotary driven part,
    wherein the torsional drive transfer device comprises a drive input element and a drive output element that are connected to one another and configured for relative rotation about a rotary axis, and a resilient drive transfer element that interconnects the drive input element and the drive output element,
    wherein the torsional drive transfer device is configured to allow limited relative rotation of the drive input element relative to the drive output element in a drive direction against a resilient reaction force provided by the resilient drive transfer element thereby providing limited relative rotation in the drive direction between the rotary drive part and the rotary driven part against the reaction force provided by the resilient drive transfer element,
    wherein the torsional drive transfer device is located in a driveline between the rotary drive part, which is connectable to a power take off of a tractor, and the rotary driven part, which comprises the flywheel, and
    wherein the torsional drive transfer device is configured to allow limited relative rotation between the rotary drive part and the rotary driven part only when a torque applied to the drive part exceeds a predetermined minimum value.

2. The rotary drive transmission according to claim 1, wherein the torsional drive transfer device is configured to allow limited relative rotation up to a maximum relative rotation angle, wherein the maximum relative rotation angle is at least 30°.

3. The rotary drive transmission according to claim 1, wherein the torsional drive transfer device is configured to allow limited relative rotation between the rotary drive part and the rotary driven part only when a torque applied to the drive part exceeds a predetermined minimum value in the range 200-1000 Nm.

4. The rotary drive transmission according to claim 3, wherein the resilient drive transfer element is pre-stressed to provide the predetermined minimum value.

5. The rotary drive transmission according to claim 1, wherein the resilient drive transfer element comprises at least one hydro-pneumatic element connected between the rotary drive part and the rotary driven part.

6. The rotary drive transmission according to claim 5, wherein the hydro-pneumatic element comprises an accumulator.

7. The rotary drive transmission according to claim 5, wherein the hydro-pneumatic element comprises an adjusting mechanism that is adjustable to provide a variable reaction force.

8. The rotary drive transmission according to claim 5, wherein the hydro-pneumatic element lies in a plane that is perpendicular to a rotary axis Z of the torsional drive transfer device.

9. The rotary drive transmission according to claim 1, wherein the resilient drive transfer element comprises at least one mechanical spring element connected between the rotary drive part and the rotary driven part.

10. The rotary drive transmission according to claim 9, wherein the mechanical spring element lies in a plane that is perpendicular to a rotary axis Z of the torsional drive transfer device.

11. The rotary drive transmission according to claim 9, wherein the mechanical spring element has a principal axis that is parallel to a rotary axis Z of the torsional drive transfer device.

12. The rotary drive transmission according to claim 9, wherein the mechanical spring element comprises a coil spring or a leaf spring.

13. The rotary drive transmission according to claim 1, wherein the torsional drive transfer device comprises a damper configured to damp relative rotational movement between the rotary drive part and the rotary driven part.

14. The rotary drive transmission according to claim 1, wherein the drive input element and the drive output element are interconnected by more than one drive transfer element.

15. A reciprocating plunger press comprising:

a bale chamber, a plunger that compresses bale material in the bale chamber, a drive mechanism that drives reciprocating movement of the plunger, a flywheel connected to a rotary input of the drive mechanism, and a rotary drive transmission comprising:

a rotary drive part, a rotary driven part that drives rotation of the flywheel, and a torsional drive transfer device that transfers rotary drive between the rotary drive part and the rotary driven part, wherein the torsional drive transfer device comprises a drive input element and a drive output element that are connected to one another and configured for relative rotation about a rotary axis, and a resilient drive transfer element that interconnects the drive input element and the drive output element, wherein the torsional drive transfer device is configured to allow limited relative rotation of the drive input element relative to the drive output element in a drive direction against a resilient reaction force provided by the resilient drive transfer element thereby providing limited relative rotation in the drive direction between the rotary drive part and the rotary driven part against the reaction force provided by the resilient drive transfer element, wherein the torsional drive transfer device is located in a driveline between the rotary drive part, which is connectable to a power take off of a tractor, and the rotary driven part, which comprises the flywheel, and wherein the torsional drive transfer device is configured to allow limited relative rotation between the rotary drive part and the rotary driven part only when a torque applied to the drive part exceeds a predetermined minimum value.

* * * * *